United States Patent
Li et al.

(10) Patent No.: US 10,204,255 B2
(45) Date of Patent: Feb. 12, 2019

(54) LIQUID CRYSTAL DISPLAY ASSEMBLY AND ELECTRONIC DEVICE

(71) Applicant: XIAOMI INC., Haidian District, Beijing (CN)

(72) Inventors: Guosheng Li, Beijing (CN); Zhongsheng Jiang, Beijing (CN); Hao He, Beijing (CN)

(73) Assignee: XIAOMI INC., Beijing (CN)

( * ) Notice: Subject to any disclaimer, the term of this patent is extended or adjusted under 35 U.S.C. 154(b) by 57 days.

(21) Appl. No.: 15/361,646

(22) Filed: Nov. 28, 2016

(65) Prior Publication Data
US 2017/0154199 A1    Jun. 1, 2017

(30) Foreign Application Priority Data
Nov. 26, 2015    (CN) .......................... 2015 1 0835513

(51) Int. Cl.
*G06F 3/044* (2006.01)
*G06K 9/00* (2006.01)
(Continued)

(52) U.S. Cl.
CPC ......... *G06K 9/0002* (2013.01); *G02F 1/1368* (2013.01); *G02F 1/13338* (2013.01);
(Continued)

(58) Field of Classification Search
CPC ..................................... G06F 3/044
See application file for complete search history.

(56) References Cited

U.S. PATENT DOCUMENTS 9,465,972 B2    10/2016    Chung et al.
2004/0252867 A1    12/2004    Lan et al.
(Continued)

FOREIGN PATENT DOCUMENTS

CN    102612677 A    7/2012
CN    103733167 A    4/2014
(Continued)

OTHER PUBLICATIONS

International Search Report (including English translation) and Written Opinion issued in corresponding International Application No. PCT/CN2016/100064, dated Jan. 3, 2017, 15 pages.
(Continued)

*Primary Examiner* — Alexander P Gross
(74) *Attorney, Agent, or Firm* — Arch & Lake LLP (57) ABSTRACT

A liquid crystal display assembly and an electronic device are provided. The liquid crystal display assembly includes: a touch screen, an upper substrate in parallel to the touch screen, a lower substrate in parallel to the upper substrate, a liquid crystal layer embedded between the upper and lower substrates, an upper polarizing plate and a lower polarizing plate attached to one side of the upper substrate and one side of the lower substrate which are opposite to the liquid crystal layer, respectively, and at least one fingerprint recognition sensor, at least one optical proximity sensor and a control chip. The at least one fingerprint recognition sensor and the at least one optical proximity sensor are respectively disposed between the upper polarizing plate and the lower polarizing plate, and the fingerprint recognition sensor is electrically connected to the control chip.

16 Claims, 5 Drawing Sheets

(51) Int. Cl.

| | | |
|---|---|---|
| *G06F 3/041* | (2006.01) | |
| *G06F 3/042* | (2006.01) | |
| *G02F 1/1333* | (2006.01) | |
| *G02F 1/1335* | (2006.01) | |
| *G02F 1/1362* | (2006.01) | |
| *G02F 1/1368* | (2006.01) | |

(52) U.S. Cl.
CPC .. *G02F 1/133512* (2013.01); *G02F 1/133514* (2013.01); *G02F 1/133528* (2013.01); *G02F 1/136286* (2013.01); *G06F 3/044* (2013.01); *G06F 3/0412* (2013.01); *G06F 3/0416* (2013.01); *G06F 3/0421* (2013.01); *G06K 9/0004* (2013.01); *G02F 2001/133302* (2013.01)

(56) References Cited

U.S. PATENT DOCUMENTS

| | | | |
|---|---|---|---|
| 2011/0096009 A1 | 4/2011 | Kurokawa et al. | |
| 2012/0319966 A1 | 12/2012 | Reynolds | |
| 2013/0201134 A1 | 8/2013 | Schneider et al. | |
| 2013/0201429 A1* | 8/2013 | Xu | G02F 1/133512 349/95 |
| 2014/0354579 A1 | 12/2014 | Paskalev et al. | |
| 2014/0354596 A1 | 12/2014 | Djordjev et al. | |
| 2014/0354597 A1 | 12/2014 | Kitchens, II et al. | |
| 2014/0354608 A1 | 12/2014 | Kitchens, II et al. | |
| 2014/0354823 A1 | 12/2014 | Kitchens, II et al. | |
| 2014/0354905 A1 | 12/2014 | Kitchens, II et al. | |
| 2015/0189136 A1 | 7/2015 | Chung et al. | |
| 2015/0212549 A1 | 7/2015 | Shin et al. | |
| 2016/0357333 A1* | 12/2016 | Huang | G06F 3/044 |
| 2017/0075461 A1* | 3/2017 | Orita | G06F 3/044 |
| 2017/0147850 A1* | 5/2017 | Liu | G06K 9/0002 |
| 2017/0262103 A1* | 9/2017 | Falco | G06F 3/046 |

FOREIGN PATENT DOCUMENTS

| | | |
|---|---|---|
| CN | 103886237 A | 6/2014 |
| CN | 104537365 A | 4/2015 |
| CN | 104850292 A | 8/2015 |
| CN | 104951159 A | 9/2015 |
| CN | 105334657 A | 2/2016 |
| EP | 2899951 A1 | 7/2015 |

OTHER PUBLICATIONS

First Office Action (including English translation) issued in corresponding Chinese Patent Application No. 201510835513.9, dated Mar. 10, 2017, 14 pages.

Extended European Search Report issued in corresponding EP Application No. 16199294, dated Apr. 3, 2017, 9 pages.

Second Office Action issued in corresponding Chinese Patent Application No. 201510835513.9 dated Jan. 17, 2018, 5 pages.

* cited by examiner

LIQUID CRYSTAL DISPLAY ASSEMBLY AND ELECTRONIC DEVICE

CROSS-REFERENCE TO RELATED APPLICATION

This application is based on and claims priority to Chinese Patent Application No. 201510835513.9, filed Nov. 26, 2015, which is incorporated herein by reference in its entirety.

TECHNICAL FIELD

The present disclosure generally relates to the field of display technology, and more particularly to a liquid crystal display assembly and an electronic device.

BACKGROUND

An electronic device has fingerprint recognition sensors that are able to recognize and verify a user's fingerprint. Only after successful verification, the user is allowed to operate the electronic device. Thus, it may avoid the electronic device being operated by a stranger and ensure safety of the electronic device.

An electronic device may have fingerprint recognition sensors evenly distributed on its liquid crystal display assembly. Upon receiving a signal about an operation on the liquid crystal display, the electronic device progressively scans on the fingerprint recognition sensors in the liquid crystal display from the first row to the last row to acquire the user's fingerprint.

SUMMARY

In view of the fact in related arts, the present disclosure provides a liquid crystal display assembly and an electronic device.

According to a first aspect of the present disclosure, a liquid crystal display assembly is provided. The liquid crystal display assembly includes: a touch screen, an upper substrate arranged in parallel to the touch screen, a lower substrate arranged in parallel to the upper substrate, a liquid crystal layer embedded between the upper substrate and the lower substrate. The liquid crystal display assembly also includes an upper polarizing plate attached to one side of the upper substrate which is opposite to the liquid crystal layer. The liquid crystal display assembly includes a lower polarizing plate attached to one side of the lower substrate which is opposite to the liquid crystal layer. The liquid crystal display assembly further includes: at least one fingerprint recognition sensor, at least one optical proximity sensor, and a control chip. The at least one fingerprint recognition sensor is disposed between the upper polarizing plate and the lower polarizing plate and is electrically connected to the control chip. The at least one optical proximity sensor is disposed between the upper polarizing plate and the lower polarizing plate and is electrically connected to the control chip.

According to a second aspect of the present disclosure, an electronic device is provided. The electronic device includes a liquid crystal display assembly according to the first aspect.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure.

Instead, they are merely examples of devices and methods consistent with aspects related to the disclosure as recited in the appended claims.

Figure 1:
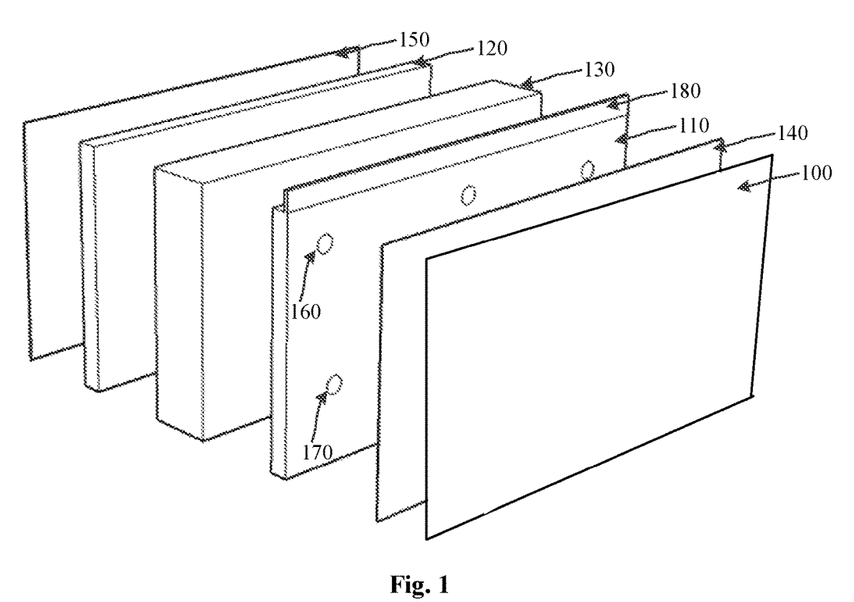
FIG. 1 is a block diagram illustrating a liquid crystal display assembly according to an exemplary embodiment.

FIG. 1 is a block diagram illustrating a liquid crystal display assembly according to an exemplary embodiment.

As shown in FIG. 1, the liquid crystal display assembly includes: a touch screen 100, an upper substrate 110 arranged in parallel to the touch screen 100, a lower substrate 120 arranged in parallel to the upper substrate 110, a liquid crystal layer 130 embedded between the upper substrate 110 and the lower substrate 120, an upper polarizing plate 140 attached to one side of the upper substrate 110 which is opposite to the liquid crystal layer 130 and a lower polarizing plate 150 attached to one side of the lower substrate 120 which is opposite to the liquid crystal layer 130.

As shown in FIG. 1, the liquid crystal display assembly further includes: at least one fingerprint recognition sensor 160, at least one optical proximity sensor 170, and a control chip 180. The at least one fingerprint recognition sensor 160 is disposed between the upper polarizing plate 140 and the lower polarizing plate 150, and is electrically connected to the control chip 180. The at least one optical proximity sensor 170 is disposed between the upper polarizing plate 140 and the lower polarizing plate 150, and is electrically connected to the control chip 180.

In the disclosure, by arranging at least one fingerprint recognition sensor and at least one optical proximity sensor between the upper polarizing plate and the lower polarizing plate respectively in the liquid crystal display assembly according to the present embodiment such that the fingerprint recognition sensor is selected according to the optical proximity sensor to perform fingerprint recognition, it is able to address the problem of resource wasting caused by usage of all the fingerprint recognition sensors of the liquid crystal display for fingerprint recognition, and thus achieve an effect of saving resources.

Figure 2:
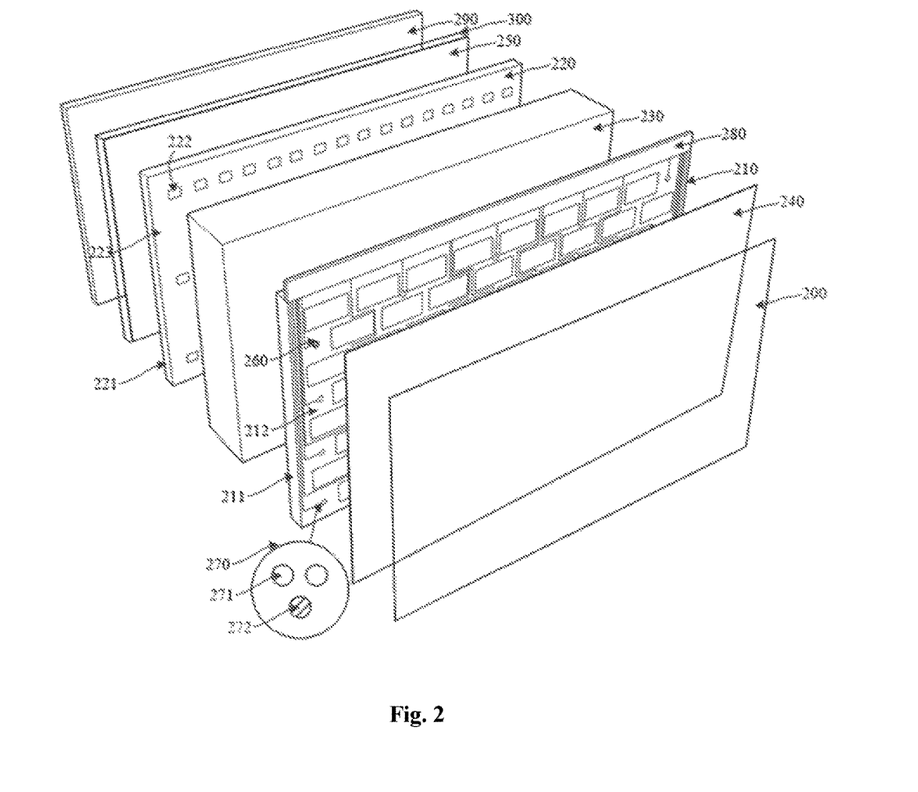
FIG. 2 is a block diagram illustrating a liquid crystal display assembly according to an exemplary embodiment.

FIG. 2 is a block diagram illustrating a liquid crystal display assembly according to another exemplary embodiment. The liquid crystal display assembly may be used in an electronic device such as a mobile phone, a tablet, a laptop, a smart television, etc.

As shown in FIG. 2, the liquid crystal display assembly includes: a touch screen 200, an upper substrate 210 arranged in parallel to the touch screen 200, a lower substrate 220 arranged in parallel to the upper substrate 210, a liquid crystal layer 230 embedded between the upper substrate 210 and the lower substrate 220, an upper polarizing plate 240 attached to one side of the upper substrate 210 which is opposite to the liquid crystal layer 230, and a lower polarizing plate 250 attached to one side of the lower substrate 220 which is opposite to the liquid crystal layer 230.

Alternatively or additionally, as shown in FIG. 2, the upper substrate 210 includes: an upper glass substrate 211 and a color filter (CF) 212. The lower surface of the upper glass substrate 211 is adjacent to the liquid crystal layer 230 and the CF 212 is attached to an upper surface of the upper glass substrate 211. The CF 212 allows the liquid crystal display (LCD) to display a color picture. The CF 212 is provided with a number of different pixel color blocks corresponding to three colors R, G, and B.

Figure 3:
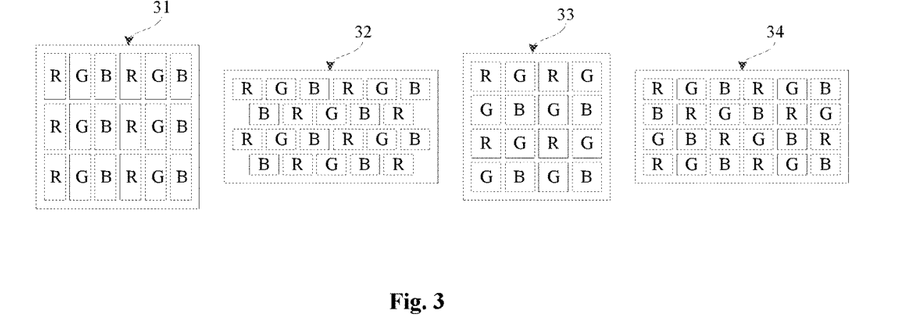
FIG. 3 is a schematic diagram illustrating different arrangements of pixel color blocks on a color filter (CF) according to an exemplary embodiment.

FIG. 3 illustrates several different arrangements of pixel color blocks on the CF exemplarily. In the first potential arrangement, as shown in the CF 31, the pixel color blocks corresponding to three colors R, G, and B are arranged in stripes. In the second potential arrangement, as shown in the CF 32, the pixel color blocks corresponding to three colors R, G, and B are arranged in triangles. In the third potential arrangement, as shown in the CF 33, the pixel color blocks corresponding to three colors R, G, and B are arranged in squares. In the fourth potential arrangement, as shown in the CF 34, the pixel color blocks corresponding to three colors R, G, and B are arranged in mosaics (or referred to as in diagonal arrangements). Certainly, the several arrangements shown in FIG. 3 are merely exemplary and explanatory, which are not intended to limit the disclosure, and other potential arrangements are possible.

Figure 4:
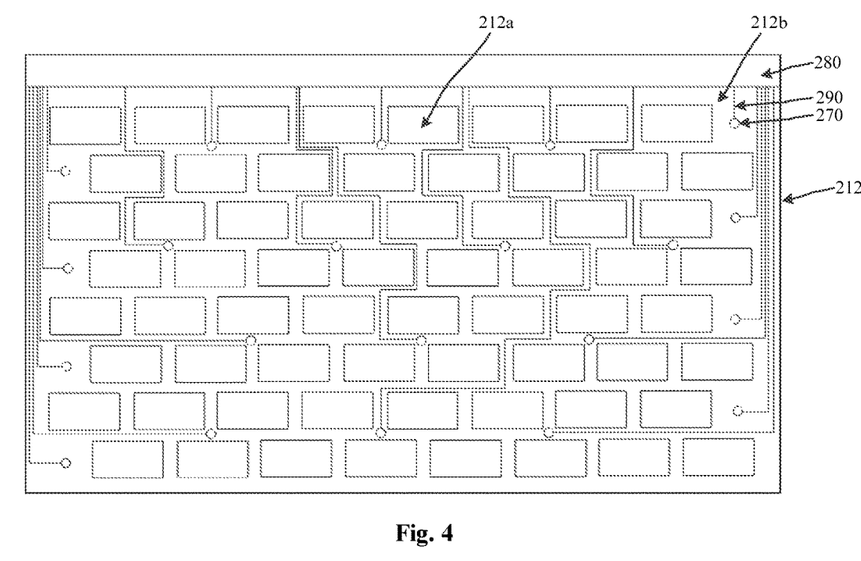
FIG. 4 is a side view illustrating a CF according to an exemplary embodiment.

In addition, referring to FIG. 2 and FIG. 4, FIG. 4 is a side view illustrating a CF 212 according to an exemplary embodiment. The CF 212 includes pixel color blocks 212a and a first black matrix 212b distributed in spaces between the pixel color blocks 212a. The pixel color blocks 212a are different pixel color blocks, which correspond to three colors R, G, and B respectively. The first black matrix 212b is distributed in the spaces between the pixel color blocks 212a. The first black matrix 212b is arranged to prevent backlight from leakage such that display contrast of the LCD is improved, color mixing is avoided and color purity is increased.

Alternatively or additionally, as shown in FIG. 2, the lower substrate 220 may include: a lower glass substrate 211 and array of TFTs 222. An upper surface of the lower glass substrate 221 is adjacent to the liquid crystal layer 230, and the lower glass substrate 221 has the array of TFTs 222 disposed on the upper surface thereof and a second black matrix 223 distributed in spaces between the array of TFTs 222.

Figure 5:
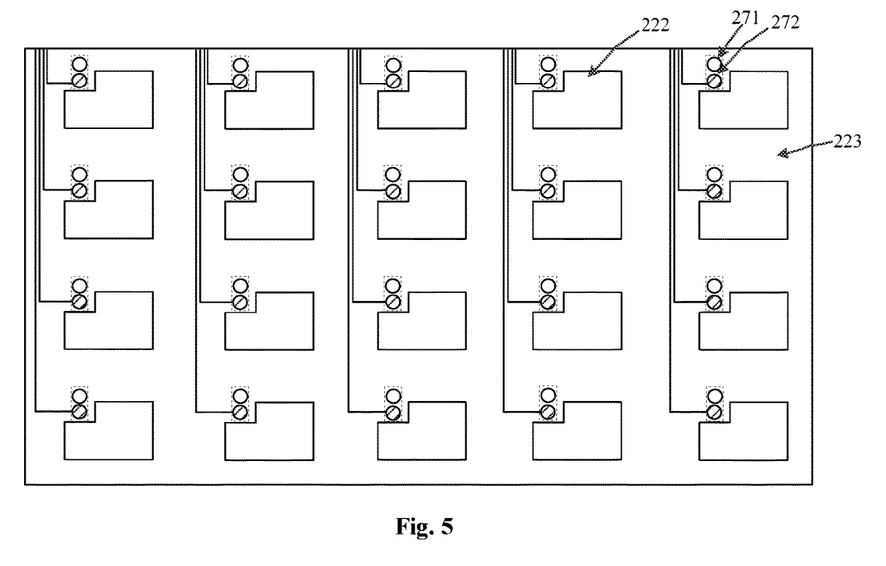
FIG. 5 is a side view illustrating a lower glass substrate according to another exemplary embodiment.

As shown in FIG. 5, it shows a side view illustrating a lower glass substrate 221. The second black matrix 212b serves to prevent backlight from leakage such that display contrast of the LCD is improved, color mixing is avoided and color purity is increased.

As shown in FIG. 2, the liquid crystal display assembly further includes: at least one fingerprint recognition sensor 260, at least one optical proximity sensor 270 and a control chip 280. The at least one fingerprint recognition sensor 260 is disposed between the upper polarizing plate 240 and the lower polarizing plate 250, and is electrically connected to the control chip 280. The at least one optical proximity sensor 270 is disposed between the upper polarizing plate 240 and the lower polarizing plate 250, and is electrically connected to the control chip 280. The proximity sensor 270 is configured to convert an optical signal into an electrical signal to be supplied to the control chip 270.

The optical proximity sensor 270 includes at least one emission terminal 271 and at least one reception terminal 272. The emission terminal 271 of the optical proximity sensor 270 is configured to emit an optical signal, which is, when an object is in proximity, blocked by the object and thereby forms a reflected signal. The reception terminal 272 is configured to receive the reflected signal. By detecting whether the reception terminal 272 of the optical proximity sensor 270 receives a reflected signal or not, it can be detected whether an object is in proximity or not.

In the following, the arrangements of the fingerprint sensors 260 and the optical proximity sensors 270 will be described in detail, respectively.

Firstly, the arrangements of the fingerprint recognition sensors 260 will be described as follows.

In an example, the fingerprint recognition sensor 260 may be disposed on an upper surface of the lower glass substrate 221. In another example, the fingerprint recognition sensor 260 may be disposed on the CF 212. Other implementations are possible.

Figure 6:
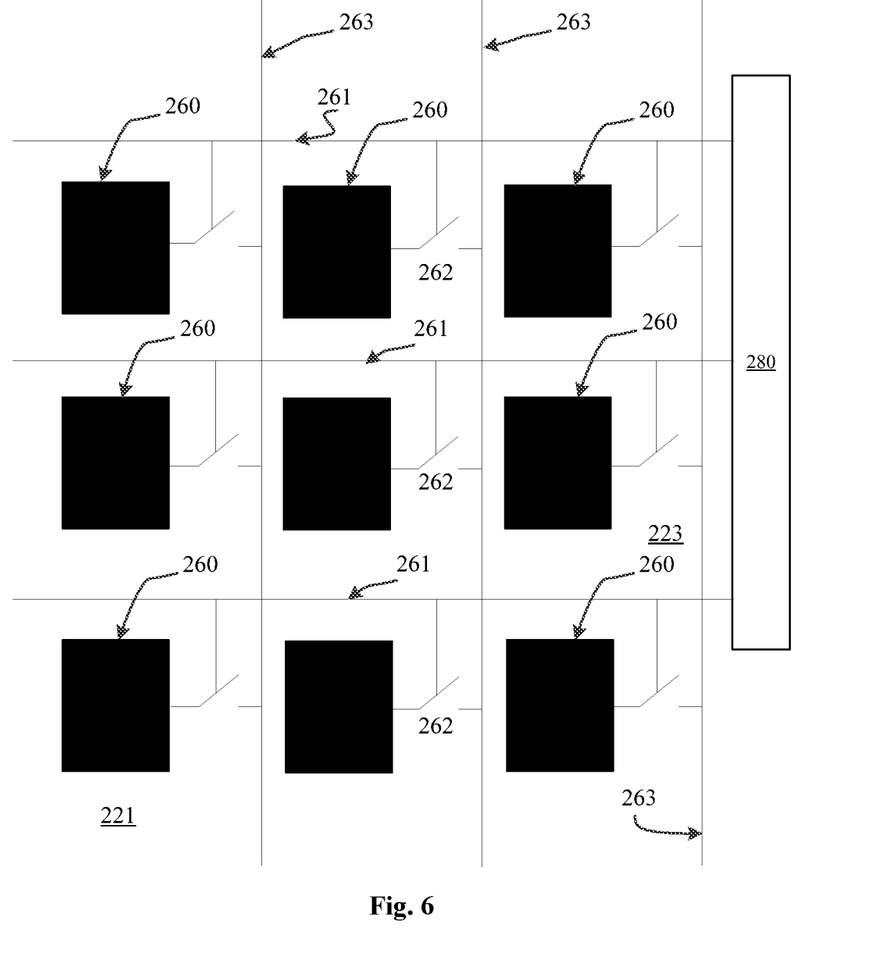
FIG. 6 is a schematic diagram illustrating a first arrangement of fingerprint recognition sensors according to an exemplary embodiment.

FIG. 6 illustrates a schematic diagram illustrating a first arrangement of the fingerprint recognition sensors 260. As shown in FIG. 6, the fingerprint recognition sensor is electrically connected to the control chip 280 via a corresponding enable line 261 and electrically connected to a data line 263 via a switch 262. The data line 263 is configured to transfer captured fingerprint data. In FIG. 6, the black rectangle represents a fingerprint recognition sensor 260, the horizontal line represents an enable line 261, and the vertical line represents a data line 263.

During initialization, all the fingerprint recognition sensors 260 are controlled to be in an idle state to wait for a scan instruction. That is to say, an enable terminal of each of the fingerprint recognition sensors 260 is electrically connected to a corresponding enable line 261 such that the fingerprint recognition sensor 260 is enabled or disabled through a signal transferred via the enable line 261 to be electrically connected to the data line 263. In FIG. 6, each of the fingerprint recognition sensors 260 is electrically connected to a corresponding enable line 261 via a switch but is not connected to a data line 263.

In present embodiment, the fingerprint recognition sensor 260 is in an idle state when the control chip 280 controls the switch 262 of the fingerprint recognition sensor 260 to be in a first state via the enable line 261; and the fingerprint recognition sensor 260 is in a working state when the control chip 280 controls the switch 262 of the fingerprint recognition sensor 260 to be in a second state via the enable line 261. The first state represents an ON state and the second state represents an OFF state.

Figure 7:
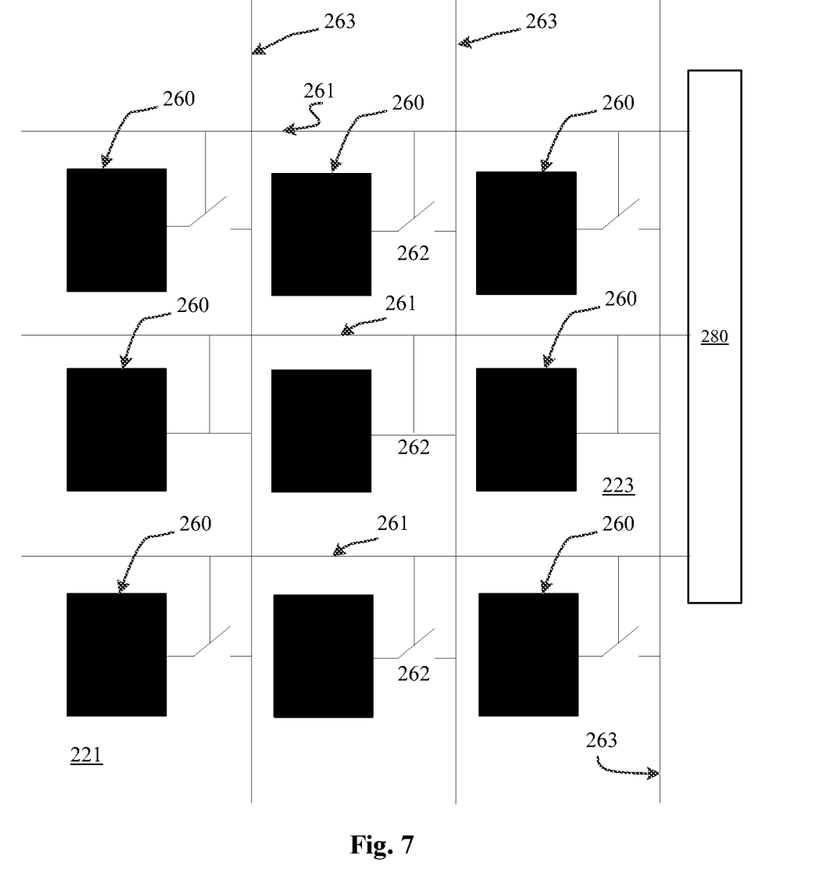
FIG. 7 is a schematic diagram illustrating a second arrangement of fingerprint recognition sensors according to an exemplary embodiment.

FIG. 7 is a schematic diagram illustrating a second arrangement of the fingerprint recognition sensors 260. When the electronic device requires controlling the second row of the fingerprint recognition sensors 260 to perform fingerprint recognition, it can controls the fingerprint recognition sensors 260 in the second row to be electrically connected to the data line 263 by using a signal transferred via the enable line 261.

After the fingerprint recognition sensors 260 are electrically connected to the data lines 263, the electronic device controls the fingerprint recognition sensors 260 to perform scanning via a scan instruction in order to acquire fingerprint data, and then transmits the fingerprint data via the data lines to perform a fingerprint recognition process. The fingerprint data are capacitance values when the fingerprint recognition sensors 260 are capacitive fingerprint recognition sensors.

Alternatively or additionally, in the case that there are multiple fingerprint recognition sensors 260, for example, the number of fingerprint recognition sensors 260 is m (m≥2), the m fingerprint recognition sensors 260 are distributed evenly and dispersedly. In FIG. 6, the fingerprint recognition sensors 260 are distributed on the lower glass substrate 221 evenly and dispersedly, for example. By arranging multiple fingerprint recognition sensors 260 and distributing them evenly and dispersedly, the present embodiment is able to solve a problem that the fingerprint recognition would fail if there is no fingerprint recognition sensor at the position operated by a user, and thus probability of successful fingerprint recognition can be improved.

In a potential implementation, as shown in FIG. 5, all the fingerprint recognition sensors 260 may be disposed on the second black matrix 223 of the lower glass substrate 221. Alternatively or additionally, all the fingerprint recognition sensors 260 may be disposed on the first black matrix 212b of the CF 212. By arranging the fingerprint recognition sensors 260 on the second black matrix 223 or on the first black matrix 212b, it is able to ensure that transmittance of the LCD will not be affected by arrangement of the fingerprint recognition sensors 260, and thereby ensure that display effects of the LCD will not be affected.

Alternatively or additionally, referring to FIG. 6 and FIG. 7, the enable 261 and the data line 263 may be disposed on the second black matrix 223. By arranging the enable 261 and the data line 263 on the second black matrix 223, it is able to ensure that transmittance of the LCD will not be affected by arrangement of the enable 261 and the data line 223, and thereby ensure that display effects of the LCD will not be affected. The wire 290 may be made of a transparent material.

Secondly, the arrangements of the optical proximity sensors 270 will be described as follows.

In an example, each of optical proximity sensors 260 may be disposed on an upper surface of the lower glass substrate 221. In such case, the emission terminal 271 and the reception terminal 272 of each of the optical proximity sensors 270 are disposed on the upper surface of the lower glass substrate 221. In another example, each of the optical proximity sensors 260 may be disposed on the CF 212. In such case, the emission terminal 271 and the reception terminal 272 of each of optical proximity sensors 270 are disposed on the CF 212. Other implementations are possible.

Alternatively or additionally, in the case that there are multiple optical proximity sensors 270, for example, the number of optical proximity sensors 270 is n (n≥2), the n fingerprint recognition sensors 270 are distributed evenly and dispersedly. At least one emission terminal 271 of the optical proximity sensors 270 is disposed on at least one of the first black matrix 212b and the second black matrix 223, and at least one reception terminal 272 of the optical proximity sensors 270 is disposed on at least one of the first black matrix 212b and the second black matrix 223.

In FIG. 5, for example, the hollow circle represents the emission terminal 271 of the optical proximity sensor 270, and the shaded circle represents the reception terminal 272 of the optical proximity sensor 270. At least one emission terminal 271 and at least one reception terminal 272 of the optical proximity sensors 270 are both distributed on the second black matrix 223 of the lower glass substrate 221 evenly and dispersedly.

In another example, at least one emission terminal 271 of all the optical proximity sensors 270 may be distributed on the first black matrix 212b evenly and dispersedly while at least one reception terminal 272 may be distributed on the second black matrix 223 evenly and dispersedly. Alternatively or additionally, at least one emission terminal 271 of all the optical proximity sensors 270 may be distributed on the second black matrix 223 evenly and dispersedly while at least one reception terminal 272 may be distributed on the first black matrix 212b evenly and dispersedly.

In another example, at least one emission terminal 271 and at least one reception terminal of a part of the optical proximity sensors may be distributed on the first black matrix 212b evenly and dispersedly, and at least one emission terminal 271 and at least one reception terminal of the remaining part of the optical proximity sensors may be distributed on the second black matrix 223 evenly and dispersedly.

In yet another example, at least one emission terminal 271 of a part of the optical proximity sensors 270 is distributed on the first black matrix 212b evenly and dispersedly while at least one reception terminal is distributed on the second black matrix 223 evenly and dispersedly, and at least one emission terminal 271 of the remaining part of the optical proximity sensors 270 is distributed on the second black matrix 223 evenly and dispersedly while at least one o reception terminal is distributed on the first black matrix 212b evenly and dispersedly.

The arrangement of the at least one emission terminal 271 and the at least one reception terminal 272 of the optical proximity sensors 270 are not limited to the embodiments of the disclosure.

By arranging multiple optical proximity sensors 270 and distributing them evenly and dispersedly such that proximity of an object is no longer detected by an optical proximity sensor 270 constrained in a certain aperture, it is able to solve a problem in related art that the reflected signal of an optical signal emitted from the emission terminal of the optical proximity sensor 270 and received by the reception terminal 272 is reduced in the case where the optical proximity sensor is arranged in an aperture, and also solve an problem that the appearance of the electronic device is affected due to the aperture in the same case.

In addition, by arranging the emission terminal 271 and the reception terminal 272 of the optical proximity sensor 270 on the second black matrix 223 or on the first black matrix 212b, it is able to ensure that transmittance of the LCD will not be affected by arrangement of the optical proximity sensors, and ensure that display effects of the LCD will not be affected.

Alternatively or additionally, referring to FIG. 4, each of the optical proximity sensors is electrically connected to the control chip 280 via a wire, and each wire 290 is also disposed on the first black matrix 212b of the CF 212 or on the second black matrix 223 of the lower glass substrate 221. By arranging the wire 290 on the first black matrix 212b or on the lower glass substrate 223, it ensures that transmittance of the LCD will not be affected by the arrangements of the wires 290. At the same time, it ensures that display effects of the LCD will not be affected. The wire 290 may be made of a transparent material, which may include glass, resin, transparent electrodes, etc.

As shown in FIG. 2, the liquid crystal display assembly may further include: at least one backlight source 300. The at least one backlight source 300 is electrically connected to the control chip 280. The backlight source 300 is disposed on a back surface of the lower polarizing plate 250. The backlight source 300 is configured to provide a light source behind the LCD panel. The backlight source 300 includes, but is not limited to, any one of an EL (Electro Luminescent) source, a CCFL (Cold Cathode Fluorescent Lamp), LED (Light Emitting Diode), and the like.

In addition, the control chip 280 may be a MCU (Microcontroller Unit), which is a chip-level computer and is also referred to as a single chip computer. In an potential implementation where the MCU controls brightness of the backlight dynamically based on an distance between a finger and a screen of the LCD calculated by the optical proximity sensors, the reception terminal 272 of each of the optical proximity sensors 270 captures the reflected signal of an optical signal emitted from the emission terminal 270, and the MCU obtains the reflected signal from the optical proximity sensor 270, performs a calculation process on the reflected signal, determines whether proximity of an object within a preset distance from the LCD panel based on results of the calculation process, and then controls the backlight source 300 to emit light or not based on the determined result. For example, the MCU controls the backlight source 300 not to emit light when the MCU determines that there is proximity of an object within 1 cm from the LCD panel; and the MCU controls the backlight source 300 to emit light when the MCU determines that there is no proximity of an object within 1 cm from the LCD panel.

Alternatively or additionally, no preset distance set in the liquid crystal display is possible. That is to say, upon reception of the reflected signal from the reception terminal 270 of the optical proximity sensor 272, it is determined that there is proximity of an object.

In addition, the display area corresponding to the liquid crystal display assembly may be an entire display area, for which at least one backlight source 300 is correspondingly provided. The backlight source 300 is configured to control brightness of the entire display area.

Figure 8:
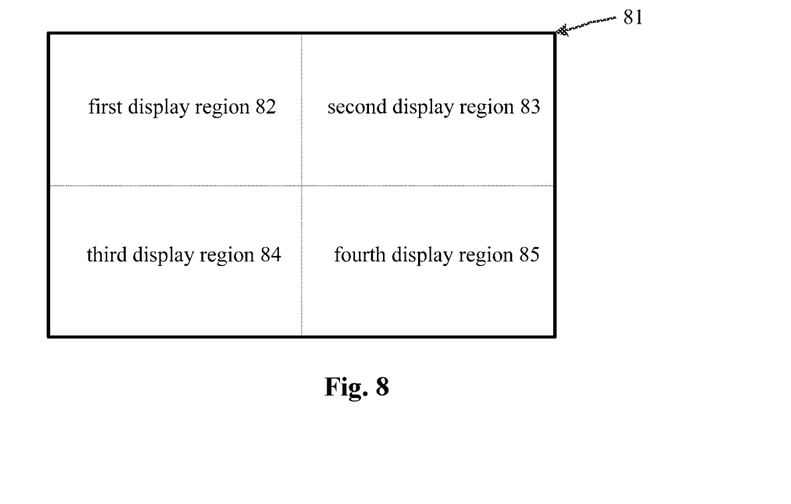
FIG. 8 is a schematic diagram illustrating a display area corresponding to a liquid crystal display assembly according to an exemplary embodiment.

Alternatively or additionally, as shown in FIG. 8, the display area 81 corresponding to the liquid crystal display may be divided into k (k display regions (such as a first display region 82, a second display region 83, a third display region 84 and a fourth display region 85 as shown in the figure). For each display region, at least one backlight source 300 and at least one optical proximity sensor 270 as well as at least one fingerprint recognition sensor 260 are correspondingly provided. For each display region, its corresponding backlight sources 300 are configured to individually control brightness of backlight of the display region. For example, assuming that for the first display region 82, a first backlight source and a first optical proximity sensor are correspondingly provided, and for the second display region 83, a second backlight source and a second optical proximity sensor are correspondingly provided. In such case, the first backlight source is configured to individually control brightness of backlight for the first display region 82 based on brightness the of ambient light captured by the first optical proximity sensor, and the second backlight source is configured to individually control brightness of backlight for the second display region 83 based on brightness of ambient light captured by the second optical proximity sensor. By dividing the display area corresponding to the LCD panel into multiple display regions and controlling brightness of backlight for the multiple display regions individually by using different backlight sources, flexibility of backlight control is thus improved.

In the disclosure, in the liquid crystal display assembly according to the present embodiment, by providing at least one fingerprint recognition sensor and at least one optical proximity sensor between the upper polarizing plate and the lower polarizing plate such that the fingerprint recognition sensor is selected according to the optical proximity sensor to perform fingerprint recognition, it is able to address the problem of resource wasting caused by usage of all the fingerprint recognition sensors on the liquid crystal display for fingerprint recognition, and thus achieve an effect of saving resources.

In addition, by arranging the fingerprint recognition sensor and the optical proximity sensor on the first black matrix of the CF or on the second black matrix of the lower substrate, it is able to ensure that light transmittance of the liquid crystal display (LCD) would not be affected by the arrangement of the fingerprint recognition sensor and the optical proximity sensor, and thereby ensure that display ability of the LCD would not be affected.

In addition, by arranging multiple fingerprint recognition sensors and distributing the multiple fingerprint recognition sensors in the liquid crystal display evenly and dispersedly, it is able to avoid failure of the fingerprint recognition in the case that there is no fingerprint recognition sensor at the position operated by a user, and thus higher success rate can be achieved.

In addition, by arranging multiple optical proximity sensors and distributing the multiple optical proximity sensors evenly and dispersedly, an optical proximity sensor is no longer limited by an transmission angle of an optical signal transmitted by a transmitting terminal and an reception angle of a reflected signal of the optical signal, and thus it is able to solve an problem that an optical proximity sensor, when the emission terminal of the optical proximity sensor emits an optical signal and the reception terminal thereof receives an reflected signal, is not able to detect proximity of an object over the entire LCD panel due to limitation of the angles, and thus the amount of the reflected signal received by the reception terminal is increased such that the optical proximity sensors can detect proximity of an object over the entire LCD panel.

An electronic device is provided according to an embodiment of the disclosure. The electronic device may be a mobile phone, a computer, a digital broadcast terminal, a message transceiver device, a game console, a tablet device, a medical device, a fitness device and a PDA, etc. The electronic device may include a liquid crystal display assembly provided in the above described embodiments shown in FIG. 1 or FIG. 2.

Other embodiments of the disclosure will be apparent to those skilled in the art from consideration of the specification and practice of the present disclosure. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A liquid crystal display assembly, comprising:
a touch screen, an upper substrate arranged in parallel to the touch screen, a lower substrate arranged in parallel to the upper substrate, a liquid crystal layer embedded between the upper substrate and the lower substrate, an upper polarizing plate attached to one side of the upper substrate that is opposite to the liquid crystal layer, and a lower polarizing plate attached to one side of the lower substrate that is opposite to the liquid crystal layer; and
at least one fingerprint recognition sensor, at least one optical proximity sensor, and a control chip,
wherein the at least one fingerprint recognition sensor is disposed between the upper polarizing plate and the lower polarizing plate and is electrically connected to the control chip; and
wherein the at least one optical proximity sensor is disposed between the upper polarizing plate and the lower polarizing plate and is electrically connected to the control chip,
wherein the upper substrate includes an upper glass substrate and a color filter (CF), the CF includes pixel color blocks and a first black matrix distributed in spaces between the pixel color blocks,
wherein the lower substrate includes a lower glass substrate and an array of thin film transistors (TFTs), wherein a lower surface of the lower glass substrate is provided with the array of TFTs and a second black matrix distributed between the array of TFTs,
wherein the optical proximity sensor includes at least one emission terminal and at least one reception terminal, and
wherein the at least one emission terminal of the optical proximity sensor is disposed on at least one of the first black matrix and the second black matrix, and the at least one reception terminal of the optical proximity sensor is disposed on at least one of the first black matrix and the second black matrix, and a part of the at least one fingerprint recognition sensor is disposed on the first black matrix and a remaining part of the at least one fingerprint recognition sensor is disposed on the second black matrix.

2. The liquid crystal display assembly of claim 1, wherein the fingerprint recognition sensor is electrically connected to the control chip via an enable line and is electrically connected to a data line via a switch.

3. The liquid crystal display assembly of claim 1, wherein the fingerprint recognition sensor is in an idle state when the control chip controls a switch for the fingerprint recognition sensor into a first state by using an enable line; and
wherein the fingerprint recognition sensor is in a working state when the control chip controls the switch for the fingerprint recognition sensor into a second state by using the enable line.

4. The liquid crystal display assembly of claim 1;
wherein a lower surface of the upper glass substrate is adjacent to the liquid crystal layer; and
the CF is attached to an upper surface of the upper glass substrate.

5. The liquid crystal display assembly of claim 4,
wherein an upper surface of the lower glass substrate is adjacent to the liquid crystal layer.

6. The liquid crystal display assembly of claim 1, wherein the optical proximity sensor is connected to the control chip via a wire.

7. The liquid crystal display assembly of claim 6, wherein the wire is disposed on one of the first black matrix and the second black matrix.

8. The liquid crystal display assembly of claim 1, wherein the liquid crystal display assembly comprises a plurality of optical proximity sensors, and the plurality of optical proximity sensors are distributed evenly and dispersedly; and
wherein the liquid crystal display assembly comprises a plurality of fingerprint recognition sensors, and the plurality of fingerprint recognition sensors are distributed evenly and dispersedly.

9. The electronic device of claim 1, wherein the optical proximity sensor is connected to the control chip via a wire.

10. The electronic device of claim 9, wherein the wire is disposed on one of the first black matrix and the second black matrix.

11. An electronic device, comprising:
a liquid crystal display assembly comprising:
a touch screen, an upper substrate arranged in parallel to the touch screen, a lower substrate arranged in parallel to the upper substrate, a liquid crystal layer embedded between the upper substrate and the lower substrate, an upper polarizing plate attached to one side of the upper substrate that is opposite to the liquid crystal layer, and a lower polarizing plate attached to one side of the lower substrate that is opposite to the liquid crystal layer; and at least one fingerprint recognition sensor, at least one optical proximity sensor, and a control chip, wherein the at least one fingerprint recognition sensor is disposed between the upper polarizing plate and the lower polarizing plate and is electrically connected to the control chip; and wherein the at least one optical proximity sensor is disposed between the upper polarizing plate and the lower polarizing plate and is electrically connected to the control chip, wherein the upper substrate includes: an upper glass substrate and a color filter (CF), the CF includes pixel color blocks and a first black matrix distributed in spaces between the pixel color blocks;

wherein the lower substrate includes: a lower glass substrate and an array of thin film transistors (TFTs), a lower surface of the lower glass substrate is provided with the array of TFTs and a second black matrix distributed between the array of TFTs;

wherein the optical proximity sensor includes at least one emission terminal and at least one reception terminal;

wherein the at least one emission terminal of the optical proximity sensor is disposed on at least one of the first black matrix and the second black matrix, and the at least one reception terminal of the optical proximity sensor is disposed on at least one of the first black matrix and the second black matrix, and a part of the at least one fingerprint recognition sensor is disposed on the first black matrix and a remaining part of the at least one fingerprint recognition sensor is disposed on the second black matrix.

12. The electronic device of claim 11, wherein the fingerprint recognition sensor is electrically connected to the control chip via an enable line and is electrically connected to a data line via a switch.

13. The electronic device of claim 11, wherein the fingerprint recognition sensor is in an idle state when the control chip controls a switch for the fingerprint recognition sensor into a first state by using an enable line; and wherein the fingerprint recognition sensor is in a working state when the control chip controls the switch for the fingerprint recognition sensor into a second state by using the enable line.

14. The electronic device of claim 11, wherein a lower surface of the upper glass substrate is adjacent to the liquid crystal layer, and wherein the CF is attached to an upper surface of the upper glass substrate.

15. The electronic device of claim 14, wherein an upper surface of the lower glass substrate is adjacent to the liquid crystal layer.

16. The electronic device of claim 11, wherein the liquid crystal display assembly comprises a plurality of optical proximity sensors, and the plurality of optical proximity sensors are distributed evenly and dispersedly; and wherein the liquid crystal display assembly comprises a plurality of fingerprint recognition sensors, and the plurality of fingerprint recognition sensors are distributed evenly and dispersedly.

* * * * *